(12) United States Patent
Streifinger (10) Patent No.: US 9,441,786 B2
(45) Date of Patent: Sep. 13, 2016

(54) DEVICE AND METHOD FOR PRESERVING FLUID SYSTEMS AND AN ENGINE

(75) Inventor: Helmut Streifinger, München (DE)

(73) Assignee: MTU AERO ENGINES GMBH, Munich (DE)

(*) Notice: Subject to any disclaimer, the term of this patent is extended or adjusted under 35 U.S.C. 154(b) by 768 days.

(21) Appl. No.: 13/640,949

(22) PCT Filed: Mar. 31, 2011

(86) PCT No.: PCT/IB2011/000719
§ 371 (c)(1),
(2), (4) Date: Oct. 15, 2012

(87) PCT Pub. No.: WO2011/128744
PCT Pub. Date: Oct. 20, 2011

(65) Prior Publication Data
US 2013/0032215 A1    Feb. 7, 2013

(30) Foreign Application Priority Data
Apr. 12, 2010   (DE) .................. 10 2010 014 637

(51) Int. Cl.
F02C 7/06    (2006.01)
F02C 7/22    (2006.01)
F16N 39/00   (2006.01)
(Continued)

(52) U.S. Cl.
CPC ............. *F16N 39/00* (2013.01); *F01D 25/002* (2013.01); *F01D 25/18* (2013.01); *F01D 25/32* (2013.01); *F02C 7/06* (2013.01); *F02C 7/22* (2013.01); *F05D 2230/80* (2013.01); *Y10T 137/0318* (2015.04); *Y10T 137/86035* (2015.04)

(58) Field of Classification Search
CPC ........ F16N 39/00; F01D 25/32; F01D 25/18; F01D 25/002; F02C 7/22; F02C 7/06; Y10T 137/0318; Y10T 137/86035; F05D 2230/80
USPC ................................ 60/734, 39.08; 184/6.11
See application file for complete search history.

(56) References Cited

U.S. PATENT DOCUMENTS 2,676,458 A * 4/1954 Hill .............................. 60/39.08
2,681,694 A * 6/1954 Loft ........................... 60/39.091
(Continued)

FOREIGN PATENT DOCUMENTS

DE          69918193 T2    7/2005
DE        102004063826 A1  1/2006
(Continued)

OTHER PUBLICATIONS

Military specification Mil-E-5595C, Aug. 1959, FSC 2840, pp. 1-10.*
(Continued)

*Primary Examiner* — Ted Kim
(74) *Attorney, Agent, or Firm* — Howison & Arnott, LLP (57) ABSTRACT

Disclosed is a device for preserving fluid systems, for example of a fuel system and an oil system of a turbine engine, with at least one drive for driving at least one fuel pump and at least one oil pump, wherein a valve arrangement is provided, which makes transfer-pumping a fluid between the fluid systems possible, an engine having such a device as well as a method for triggering such a device or for preserving fluid systems.

3 Claims, 6 Drawing Sheets

(51) Int. Cl.
　　*F01D 25/00*　　(2006.01)
　　*F01D 25/18*　　(2006.01)
　　*F01D 25/32*　　(2006.01)

(56) References Cited

U.S. PATENT DOCUMENTS

| | | | | |
|---|---|---|---|---|
| 2,768,496 | A | * | 10/1956 | Stamm et al. .............. 60/39.463 |
| 5,554,278 | A | | 9/1996 | Henderson |
| 5,964,318 | A | * | 10/1999 | Boyle et al. .................... 184/1.5 |
| 2006/0260323 | A1 | | 11/2006 | Moulebhar |
| 2007/0028589 | A1 | * | 2/2007 | Alexander et al. ........... 60/39.08 |
| 2008/0176033 | A1 | * | 7/2008 | Kwoka ......................... 428/131 |
| 2009/0151314 | A1 | | 6/2009 | Tumelty et al. |
| 2009/0252604 | A1 | * | 10/2009 | Alexander et al. ........... 415/180 |

FOREIGN PATENT DOCUMENTS

| | | |
|---|---|---|
| DE | 102007051498 A1 | 4/2009 |
| DE | 102010014637.4 A1 | 10/2011 |
| EP | 0928883 A1 | 7/1999 |

OTHER PUBLICATIONS

Iyer, "Some Practical Hints on Preservation of Aircraft Engines Using a Rig From Corrosion Problems", Proceedings of the 2006 IASME/WSEAS International Conference on Energy & Environmental Systems, Chalkida, Greece, May 8-10, 2006 (pp. 506-526).*
PCT: International Search Report and Written Opinion of PCT/IB2011/000719; Oct. 7, 2011; 6 pages.

* cited by examiner

| OPERATING STATES AND SWITCH SETTINGS OF THE VALVES FOR AN ENGINE STORED IN A CONTAINER | | | | |
|---|---|---|---|---|
| MODE | DESCRIPTION | MAIN VALVE 18 | OIL VALVE 108 | FLUID VALVE 120 |
| 1 | OIL SYSTEM (OS) AND FUEL SYSTEM (FS) PRESERVATION RUN | - | A | III |
| 2 | SAMPLING FROM FS AND OS | - | B | IV |
| 3 | REFILLING THE FS WITH OIL FROM THE OIL TANK | - | B | II |
| 4 | REFILLING THE OIL TANK WITH OIL FROM EXTERNAL TANK | - | A | ANY |
| 5 | FS OIL CHANGE WITH FLUID FROM/IN EXTERNAL TANK | - | C | IV |
| 6 | FS OIL CHANGE WITH FLUID FROM OIL TANK IN EXTERNAL TANK | - | B | IV |
| 7 | OS OIL CHANGE WITH FLUID FROM/IN EXTERNAL TANK | - | A | ANY |

FIG. 5
(TABLE 1)

FIG. 7

| \multicolumn{5}{c}{OPERATING STATES AND SWITCH SETTINGS OF THE VALVES FOR AN ENGINE INSTALLED ON AN AIRCRAFT} |||||
| MODE | DESCRIPTION | MAIN VALVE 18 | OIL VALVE 108 | FLUID VALVE 120 |
| --- | --- | --- | --- | --- |
| 8 | NORMAL OPERATION OF THE KS AND OS | 2 | A | I |
| 9 | REPLACING THE FUEL IN THE FS WITH OIL FROM OIL TANK | ANY | B | II |
| 10 | REPLACING THE FUEL IN THE FS WITH OIL FROM/IN EXTERNAL TANK | 1 | C | IV |
| 11 | OS AND KS PRESERVATION RUN | ANY | A | III |
| 12 | DRAINING THE OIL FROM THE FS TO EXTERNAL TANK AND FILLING WITH FUEL FROM FUEL TANK | 2 | A | IV |
| 13 | DRAINING THE OIL FROM THE FS TO THE FUEL TANK AND FILLING WITH FUEL FROM THE FUEL TANK | 2 | A | II |
| 14 | SAMPLING FROM FS AND OS | ANY | B | IV |
| 15 | REFILLING THE FS WITH OIL FROM THE OIL TANK | ANY | B | II |
| 16 | REFILLING THE OIL TANK WITH OIL FROM EXTERNAL TANK | ANY | A | ANY |
| 17 | FS OIL CHANGE WITH OIL FROM/IN EXTERNAL TANK | 1 | C | IV |
| 18 | FS OIL CHANGE WITH OIL FROM OIL TANK IN EXTERNAL TANK | ANY | B | IV |
| 19 | OS OIL CHANGE WITH FLUID FROM/IN EXTERNAL TANK | ANY | A | ANY |

FIG. 6
(TABLE 2)

DEVICE AND METHOD FOR PRESERVING FLUID SYSTEMS AND AN ENGINE

CROSS-REFERENCE TO RELATED APPLICATIONS

This application is a U.S. National Phase application submitted under 35 U.S.C. §371 of Patent Cooperation Treaty application serial no. PCT/IB2011/000719, filed Mar. 31, 2011, and entitled DEVICE AND METHOD FOR PRESERVING FLUID SYSTEMS AND AN ENGINE, which application claims priority to German patent application serial no. 10 2010 014 637.4, filed Apr. 12, 2010, and entitled VORRICHTUNG UND VERFAHREN ZUM KONSERVIEREN VON FLUIDSYSTEMEN UND TRIEBWERK.

Patent Cooperation Treaty application serial no. PCT/IB2011/000719, published as WO 2011/128744, and German patent application serial no. 10 2010 014 637.4, are incorporated herein by reference.

TECHNICAL FIELD

The invention relates to a device for preserving fluid systems, for example of a fuel system and an oil system of a turbine engine, an engine as well as a method for preserving these types of fluid systems.

BACKGROUND

In the case of the long-term storage of engines, involved preservation work and regular maintenance is required in order to avoid corrosion of bearings and gears, contamination and aging of the operating fluids and to keep the seals from drying out. The high expense for personnel and costs incurred during the preservation and maintenance work is particularly glaring in the case of unmanned aerial vehicles (UAVs), which are often stored for up to 10 years without being deployed.

In the case of the separate long-term storage of engines, relevant maintenance instructions require operating fluids such as e.g., the fuel and lubricating oil to be replaced with an appropriate preservation oil. In this case, regular cranking of the stored engine is prescribed in order to wet the bearings, gear wheels and pumps or to keep the seals moist etc. with the preservation oil. Cranking is traditionally carried out by hand, which, in turn, is reflected by the high personnel costs.

Instead of this, engines installed in an aircraft must in some cases be cranked at regular intervals by a starter and pass ground runs. In this case, the fuel consumed in particular during the ground runs as well as the required safety measures result in high costs.

In addition, the preservation oil for separate long-term storage in a container as well as for long-term storage in the aircraft has to be changed after a prescribed storage time.

Figure 1:
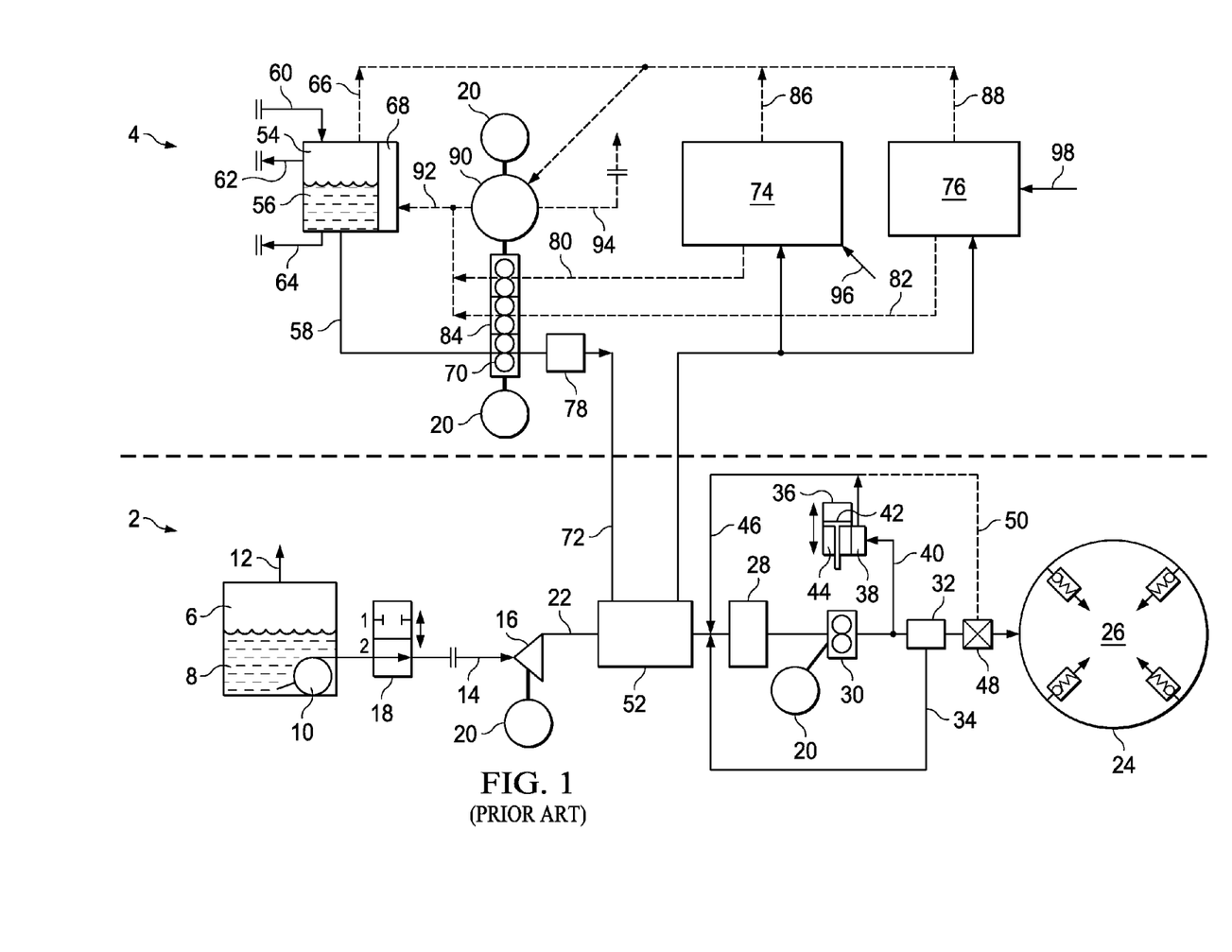
FIG. 1 A first conventional fuel system and oil system of a turbine engine according to the Prior Art.

FIG. 1 depicts a fuel system and oil system that must be maintained in a conventional manner. The fuel system 2 has a fuel tank 6 to accommodate a fuel 8, which is conveyed via a filling pump 10 to the engine fuel pump 16. The fuel tank 6 has a tank vent 12 and an outlet line 14 for removing the fuel 8. The outlet line 14 is connected to a forepump 16 and has a shut-off valve or a main valve 18 to control the outlet line 14 to open or close, which is configured as a 2/2 directional valve. In its first operating position 1, which represents the fail-safe mode, the main valve 18 is controlled to close and no fuel 8 may be removed from the fuel tank 6.

In its depicted second operating position 2, the main valve 18 is controlled to open and fuel 6 may be removed from the fuel tank 8.

The forepump 16 is connected to a gear mechanism 20 and is connected to a fuel line 22, which discharges into a fuel distribution system 24 of a combustion chamber 26. To prevent impurities of the fuel 8 in the fuel line 22, a filter 28 is arranged in said line. A gear pump 30, which can be triggered via the gear mechanism 20, is provided downstream from the filter 28. To meter out the fuel quantity which is supplied or is supposed to be supplied to the distribution system 24, a fuel metering device 32 with an overflow line 34 is connected downstream from the gear pump 30. The overflow line 34 discharges upstream from the filter 28 into the fuel line 22 and makes it possible to recirculate an excess fuel quantity. Upstream from the fuel metering device 32, one or more fuel-hydraulic actuators 36 with electro-hydraulic servo valves 38 are connected to the fuel line 22 via one or more branch lines 40. The fuel-hydraulic actuator 36 has a piston 42, which is movably guided in a cylinder 44. The fuel 8 may be recirculated into the fuel line 22 via an actuator line 46, which extends from the electro-hydraulic servo valve 38 and discharges upstream from the filter 28 into the fuel line 22. To increase a fuel pressure for the actuator 36, the servo valve 38, and other valves integrated into the fuel metering device 32, such as a metering valve, engine shut-off valve and engine emergency shut-off valve, a pressure-increasing valve 48 is connected downstream from the fuel metering device 32, which pressure-increasing valve is operatively connected to the actuator line 46 via a control line 50. To generate a heat exchange between the fuel 8 and an oil 56 conveyed in the oil system 4, a heat exchanger 52 is arranged in the fuel line 22 between the forepump 20 and the filter 28. The heat exchanger 52 may also be arranged in another position, for example behind the pressure-increasing valve 48.

Described in a very simplified manner, the oil system 4 has an oil tank 54 for accommodating the oil 56, an outlet channel 58 for removing the oil 56 as well as a filling channel 60 for filling the tank. In addition, the oil tank 54 has an overflow channel 62, a drainage channel 64, for example for sampling, a tank ventilation channel 66 and an oil level sensor 68. The outlet channel 58 is connected to a feed pump 70, which is operatively connected to the gear mechanism 20. Extending from the feed pump 70 are at least one oil channel 72 to bearing compartments and gear mechanisms 74 of the engine as well as to a starting unit or generator 76. The starting unit or the generator 76, however, does not necessarily represent a part of the oil system 4, but may have a separate oil system. The oil channel 72 is guided through the heat exchanger 52 and has a filter upstream from the heat exchanger 52 to prevent impurities. The bearings and gear wheels in the bearing compartments and gear mechanisms 74 as well as the generator 76 respectively have a suction channel 80, 82, which leads respectively to the oil tank 54 and in which a corresponding suction pump 84 is respectively arranged. In addition, the bearing compartments and gear mechanism 74 as well as the starting unit 76 and the oil tank 54 have ventilation channels 86, 88, 66 to discharge oil, bearing compartment sealing air, which, for example, in the case of higher pressure, guarantees a leak tightness of e.g., gap seals, brush seals, labyrinth seals or mechanical seals 96, 98 between bearing compartments and main shafts, and other gas vapors, which are in fluid connection with an centrifugal oil separator 90. The oil separator 90, which has an operative mechanical connection to the gear mechanism 20, has a duct 92 to recirculate the oil 56 deposited in the oil separating device 90 to the oil tank 54 as well as a ventilation channel 94 to release the bearing compartment sealing air and gas vapors. To prevent air from penetrating into the oil system 4 via the bearing compartments and gear mechanism 74 as well as the starting unit 76, these are virtually hermetically sealed via corresponding seals 96, 98. Said seals are under pressure with sealing air from outside the air chambers 74. The so induced air flow in the chambers 74 prevents oil 56 from escaping through the seals 96, 98.

In the case of the known oil and fuel systems described above, the pumps 16, 30, 70, 84 as well as the oil separator 90 are triggered respectively by a gear mechanism 20, which is operatively connected to an engine shaft, in particular a high-pressure shaft of the engine. Similarly, the electric generator/starter 76 is driven via a or the gear mechanism 20 and therefore via the engine shaft. Consequently, the fuel pumps 16, 30 as well as the oil pumps 70, 84 possess a speed which is proportional to the rotational speed of the engine shaft. In the optional function as a starter, the generator/starter 76 puts the engine shaft into rotation via the gear mechanism 20. Instead of the electric starter 76, an air turbine motor (not shown) is frequently used for starting.

Figure 2:
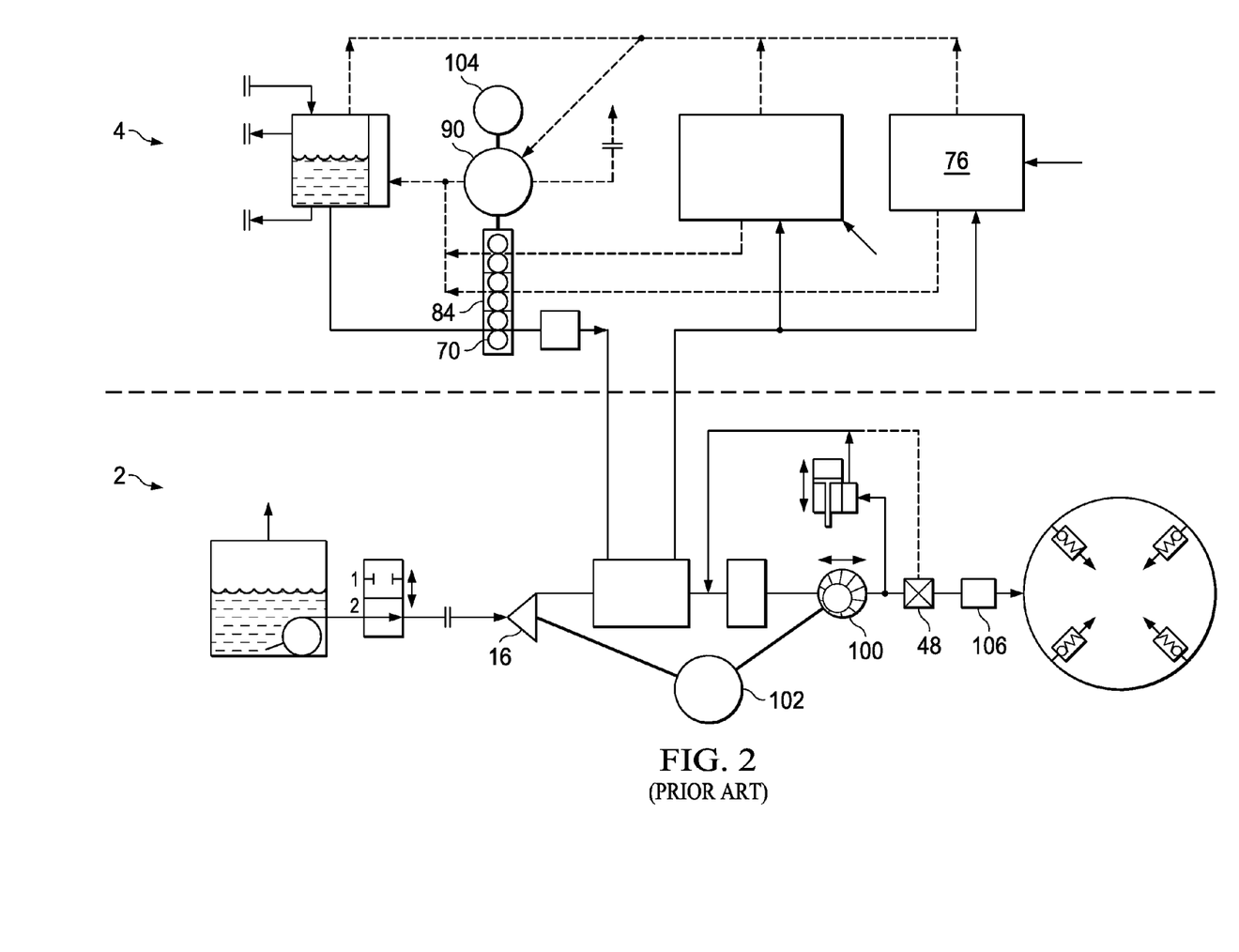
FIG. 2 A second conventional fuel system and oil system of a turbine engine according to the Prior Art.

FIG. 2 depicts a recent concept of an oil system and a fuel system. In this regard, see the applicant's German Patent Application DE 10 2007 051 498 A1. In contrast to the oil system 4 and fuel system 2 shown in FIG. 1, these more recent systems 2, 4 each have an electric motor 102, 104 for driving the fuel pumps 16, 100 or the oil pumps 70, 84 as well as the oil separation device 90. In this case, on the fuel side, the previous gear pump 30 located downstream is designed here as an adjustable displacement pump 100. In addition, the conventional fuel metering device 32 is replaced with the pump 100 and a fuel through-put measuring device 106 downstream from the pressure-increasing valve 48 for increasing the fuel pressure. Because of the adjustability of the displacement pump 100, it is possible to dispense with an overflow line 34. The internal or external starting unit 76 is driven via a shaft of the engine with the interconnection of a gear mechanism. As an option, the high-pressure shaft and the low-pressure shaft of the engine may be provided with directly driven forward or rear generators or starter/generators. This recent concept permits variable and individual adjustment of the feed rates of the oil and fuel pumps 70, 84, 16, 100. However, the fact that this concept also entails substantial maintenance cost is problematic, because, for example, fluid exchange of the fuel system in particular is expensive and the bearings still need to be wetted with oil regularly and cranked as described at the outset. Similarly, monitoring the systems and particularly the quality of the preservation fluid is expensive.

SUMMARY AND DESCRIPTION

Objects of the present invention include creating a device for preserving fluid systems, for example of a fuel system and an oil system of a turbine engine, which eliminates the aforementioned disadvantages and permits a fully automated or almost fully automated preservation, an engine, which may be preserved in an automated manner as well as a method for carrying out such a preservation.

This object is attained by a device with the features of as described and claimed herein, by an engine with the features of as described and claimed herein and by a method with the features of as described and claimed herein.

A device according to the invention for preserving fluid systems, for example of a fuel system and an oil system of a turbine engine, has at least one drive for driving at least one fuel pump and at least one oil pump. This propulsion may be accomplished directly or via a driven engine shaft and a gear mechanism connected thereto and to the pumps. According to the invention, a valve arrangement is provided which makes it possible to transfer-pump a fluid between the fluid systems. The attainment according to the invention is particularly advantageous in that the fuel system and the oil system are able to be in fluid connection with each other so that the fluid can be conveyed at least from the one fluid system, e.g., the oil system, to the other fluid system, e.g., the fuel system. This then makes a simplified fluid exchange possible, which is associated with reduced maintenance and personnel costs.

In the case of a preferred exemplary embodiment, a circulation of the fluid in the fluid systems is made possible, which significantly increases the degree of automation. To this end, a fuel system or the fuel system must be modified in such a way for example that recirculating the fluid in the fuel system is possible at all. The recirculation of the fluid in the fuel system replaces the expensive, complicated and dangerous ground runs, because now the fuel system components are protected by the circulating fluid. In this case, an inadvertent interconnection of the two fluid systems during operation is prevented by an appropriate safety device. For example, valves for the valve arrangement may be designed in such a way that, in their fail-safe mode, they are in their respective closed or locked position, in which any fluid communication between the fluid systems via the valves is interrupted.

In the case of one exemplary embodiment, a pressure relief of the one fluid system takes place via the other fluid system, which makes it possible to reduce the number of required system interfaces to the outside environment for example.

In order to prevent impurities of the fluid and therefore damage to the fluid systems and their elements or components, it is advantageous if at least one cleaning device is provided for separating and eliminating impurities from the fluid. For example, a heating device may be arranged in the fluid systems, which makes it possible to heat the fluid to over approx. $T_{Fluid}>100°$ C., for example 120° C., so that accumulated water vaporizes and, in addition, biological impurities are killed. Appropriate ventilation valves may be provided to remove the water vapor. In this case, the quality of the fluid may be controlled during preservation via at least one measuring device with a measuring sensor system.

The preservation may be further automated, if a removal device for removing the fluid from the fluid systems and/or a fluid changing device is provided in the fluid systems for changing the old fluid for fresh fluid. The removal device in this case may be used both for taking fluid samples for laboratory tests as well as for completely draining the fluid from at least one of the fluid systems as preparation for a start-up. Similarly, it is advantageous if a filling device is provided for refilling the fluid into the fluid systems.

In order to detect a malfunction or damage to the system components or the device in a timely manner per se, it is advantageous if a control device is provided for controlling the device and valve arrangement elements.

The attainment according to the invention as a rule allows the fully automated preservation and start-up of a motor with two or more fluid systems that are separated per se, which are filled for preservation with the same preservation fluid. The attainment according to the invention is suitable in particular for the fully automated preservation and start-up of a motor, for example also a ship engine or a stationary gas turbine, with two or more fluid systems that are separate per se, through which the same preservation fluid is recirculated at prescribed intervals to protect it from corrosion and seal leaks. Nevertheless, the device according to the invention also allows a manual preservation, wherein the preservation may be guided and controlled by an engine control unit (ECU) independent of its degree of automation during storage of the engine on an aircraft for example.

An engine according to the invention has an oil system and a fuel system which can be fluidly interconnected for the purpose of preservation so that, for example, the fuel system may be supplied via the oil system with a preservation fluid. In addition, the preservation fluid may be circulated or recirculated in the fuel system and in the oil system so that ground runs of the engine may be eliminated. In this case, it is especially advantageous if the preservation fluid corresponds to the operating oil in the oil system and said oil is checked regularly with regard to its condition and/or its aging and, if necessary, replaced with fresh oil or mixed with fresh oil.

In the case of a method according to the invention for preserving fluid systems, for example of a fuel system and an oil system, with at least one drive for driving at least one fuel pump and at least one oil pump for conveying fuel or oil through the fuel system or through the oil system, first the fuel is removed from the fuel system. Then at least a partial flow of the oil is conveyed from the oil system or an external tank into the fuel system. Finally, the oil is transfer-pumped to the fuel system for preservation. Similarly, the oil is transfer-pumped to the oil system for preservation. The particular advantage of this method is that the preservation of both fluid systems is carried out in an automated, and therefore cost-effective, manner at regular intervals.

To preserve the bearings and gear mechanism, the main shafts or engine shafts may be cranked with the starter/generator. If all the main shafts do not have a starter/generator that can be switched to crank as a motor, then a mechanical, electrical, hydraulic or pneumatic connection may be established between the shafts.

In the case of one exemplary embodiment, prior to starting up the turbomachine after preservation, the oil system and the fuel system are closed off from each other and the oil in the fuel system is replaced with fuel, wherein it is collected in an external tank. However, the oil in the fuel system may also be conveyed into the fuel tank and mixed there with supplied fuel and subsequently burned.

The oil may be heated to an approximate temperature of T>100° C., for example 120° C., to separate water and to kill bacteria, fungi and the like.

Other advantageous exemplary embodiments of the present invention are the subject of other subordinate claims.

BRIEF DESCRIPTION OF THE DRAWINGS

In the following, preferred exemplary embodiments of the invention will be explained in greater detail on the basis of schematic representations, which show.

DETAILED DESCRIPTION

Figure 3:
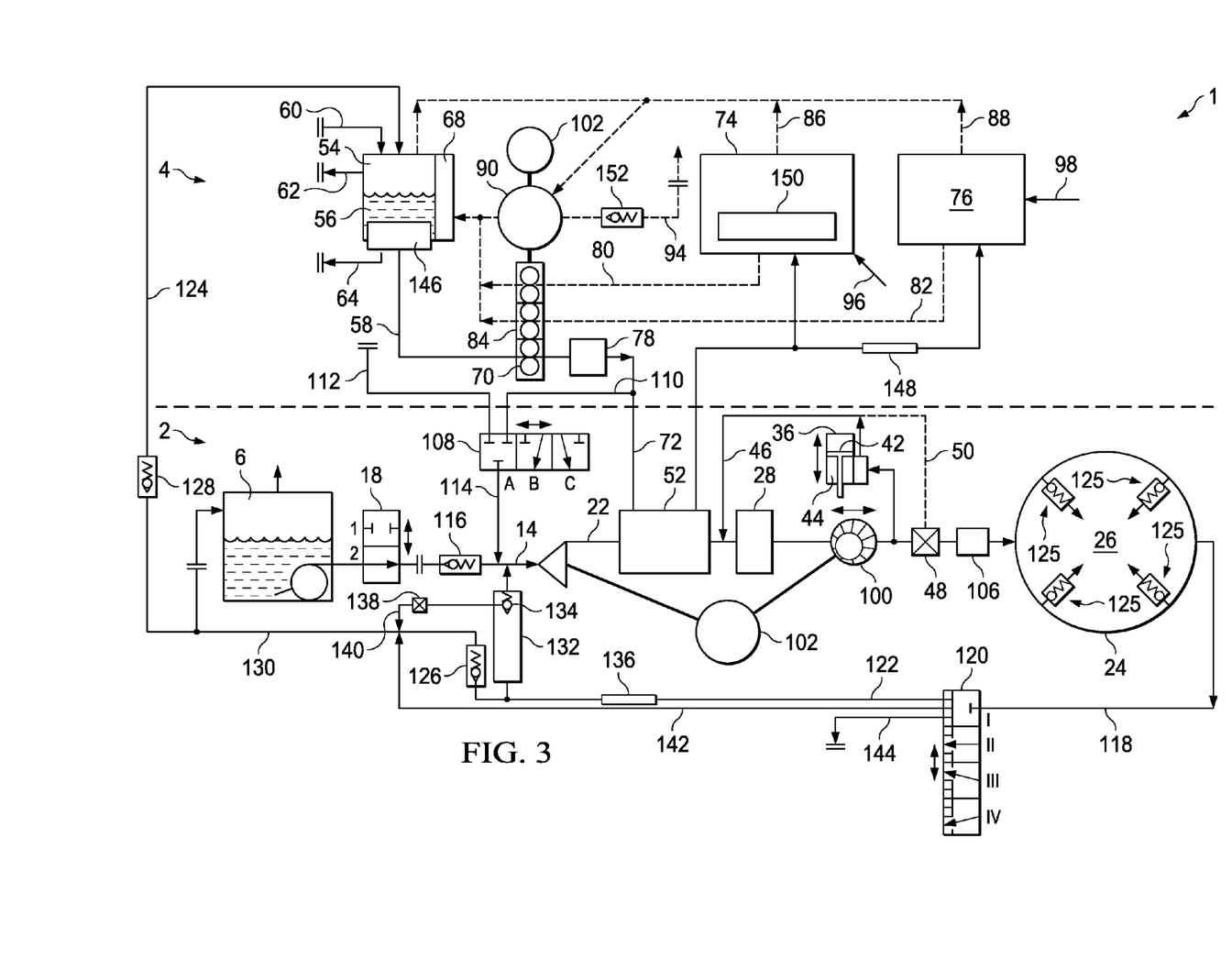
FIG. 3 A first device according to the invention for preserving a fuel system and an oil system.

According to the depiction in FIG. 3, the device 1 according to the invention is based on the fuel system and oil system described in FIG. 2 so that the same reference numbers are used for the same elements and explanations regarding these known elements are essentially omitted. However, the device 1 according to the invention has a valve arrangement, which makes it possible to transfer-pump a fluid between the fluid systems 2, 4. In this connection, FIG. 3 shows the device 1 for preserving the fluid systems 2, 4 of an engine when it is mounted on an aircraft and is in operation, where the fluid systems 2, 4 are being operated separately from one another with their respective fluid (oil valve 108, closed setting A; fluid valve 120, closed position I).

The device 1 according to the invention has a directional valve 108, via which the oil 54 can be fed from the oil system 4 to the fuel system 2. The directional valve 108, which is designated as an oil valve in the following, is configured as a 3/3 directional valve with two inlet connections, one outlet connection and three switch settings. A supply line 110 extending from the oil channel 72 is attached to the one inlet-side connection. The other inlet-side connection can be connected via a tank line 112 to an external tank (see FIG. 4). Extending from the outlet-side connection is a valve line 114, which discharges downstream from the shut-off valve 18 in the outlet line 14, wherein, to prevent an introduction of the oil 56 to the fuel tank 6 via the shut-off valve 18, a non-return valve 116 is arranged between the shut-off valve 18 and the discharge region of the valve line 114.

In its depicted first switch setting A, which represents the fail-safe mode, the oil valve 108 is controlled to close and the oil 56 from the oil system 4 cannot be transfer-pumped into the fuel system 2. In its second switch setting B, the tank line 112 is blocked and the supply line 110 is controlled to open so that the oil 56 flows off from the oil channel 72 into the fuel system 2. In its third switch setting C, the supply line 110 is controlled to close and the tank line 112 is controlled to open so that the oil 56 from an external tank can be conveyed into the fuel system 2.

In addition, the device 1 according to the invention has a 4/4 directional valve 120 with an inlet-side connection, three outlet-side connections and four switch settings. The directional valve 120 is designated as a fluid valve in the following.

An output line 118, which extends from the distribution system 24 of the combustion chamber 26, is attached on the inlet-side connection. In this case, pressure control valves 125 prevent fluid from escaping into the combustion chambers.

A circulation line 122, which discharges downstream from the non-return valve 116 in the outlet line 14 of the fuel tank 6, is attached on the outlet-side connection. Thus, the fluid or oil 56 inside the fuel system 2 may circulate or recirculate for preservation. To heat the oil 56 during recirculation, a heating device 132 with a downstream non-return valve 134 is arranged in the circulation line 122, and said non-return valve prevents fuel from flowing in the direction of the heating device 132 during normal operation (FIG. 3) or oil 56 from flowing in the direction of the heating device 132 during introduction of the oil 56 via the oil valve 108. The water vapor that develops when heating the oil 56 in the heating device 132 may be released via a ventilation valve 138, which is arranged in an excess pressure line 140, which extends away from the heating device 132 and discharges into a fuel tank line 130. To measure the quality of the oil or fluid 56, a corresponding measuring device 136 is arranged in the circulation line 122 upstream from the heating device 132.

The fuel tank line 130 extends from the circulation line 122 downstream from the heating device 132 and discharges into the fuel tank 6. Arranged in the fuel line 130 is a non-return valve 126, which is used as pressure relief valve for the circulation line 122 and simultaneously prevents backflow from the fuel line 130 into the circulation line 122.

In addition, a pressure relief line 124, which discharges into the oil tank 54 and in which a pressure relief valve 128 configured as a non-return valve is also arranged, extends downstream from the pressure relief valve 126 or the fuel tank 6 from the fuel tank line 130. This valve 128 serves as pressure relief for the fuel system 2 when the engine is stored in a container, i.e., without a fuel tank 6. On the other hand, in the case of a running engine in an aircraft, pressure relief of the fuel system 2 in the oil system 4 would not be permissible. Because the pressure in the oil tank 54 is always equal to or greater than in the fuel tank 6, only a low opening pressure is required for the pressure relief valve 128.

A recirculation line 142, which discharges downstream from the pressure relief valve 126 into the fuel tank line 130, is attached to the third outlet-side connection of the fluid valve 120 so that the oil 56 can be conveyed into the fuel tank 6.

A drainage line 144 for draining the fluid or for taking a fluid sample is attached at the third outlet-side connection of the fluid valve 120.

In its depicted first switch position I, which represents the fail-safe mode, the fluid valve 120 is controlled to close so that, in combination with the oil valve 108 in its closed setting A, the two systems 2, 4 are closed off from each other and operated individually. In other words, in the oil system 4, the oil is transfer-pumped for lubrication and, in the fuel system 2, the fuel 8 is burned in the combustion chamber 26. In its second switch position II, the recirculation line 142 is controlled to open and the preservation oil 56 may be conveyed into the fuel tank 6 or fuel can be conveyed into the fuel tank 6, if it is being replaced with preservation oil. At the same time, the fuel system 2 is relieved of pressure to the fuel tank 6 via the pressure relief valves 126, 128 and blocked off from the oil tank 54. The remaining outlet-side connections are controlled to close. In its third switch position III, the circulation line 122 is controlled to open and the oil 56 can be heated in the fuel system 2 via the heating device 132 and recirculated. At the same time, the fuel system 2 is relieved of pressure to the fuel tank 2 via the pressure relief valves 126, 128 as well as via the ventilation valve 138 and blocked off from the oil tank 54. The remaining outlet-side connections are controlled to close. In its fourth switch position IV, the drainage line 144 is controlled to open and the oil 56 can be conveyed into an external tank. Similarly, an oil sample may be taken in this switch position. The remaining outlet-side connections are controlled to close.

In addition, the device 1 according to the invention has a heating device 146 in the region of the oil tank 54 to heat the pumped-off oil 56. A corresponding measuring device 148 to measure the quality of the fluid 56 is arranged in the oil channel between the bearing compartments 74 and the starting unit 76. Furthermore, the bearing compartments and gear mechanism 74 are provided with mechanical seals 150.

The mechanical seals are not mandatory, however, merely preferred since they reliably prevent the penetration of dirty water, etc. into the bearing compartments in contrast to contactless gap seals such as labyrinth seals for example. In order to prevent moisture or other impurities from being able to penetrate into the device 1 via the ventilation channel 94 of the oil separator 90, a non-return valve 152, which is blocked in the direction of the oil separator 90, is arranged in the ventilation channel 94.

Figure 4:
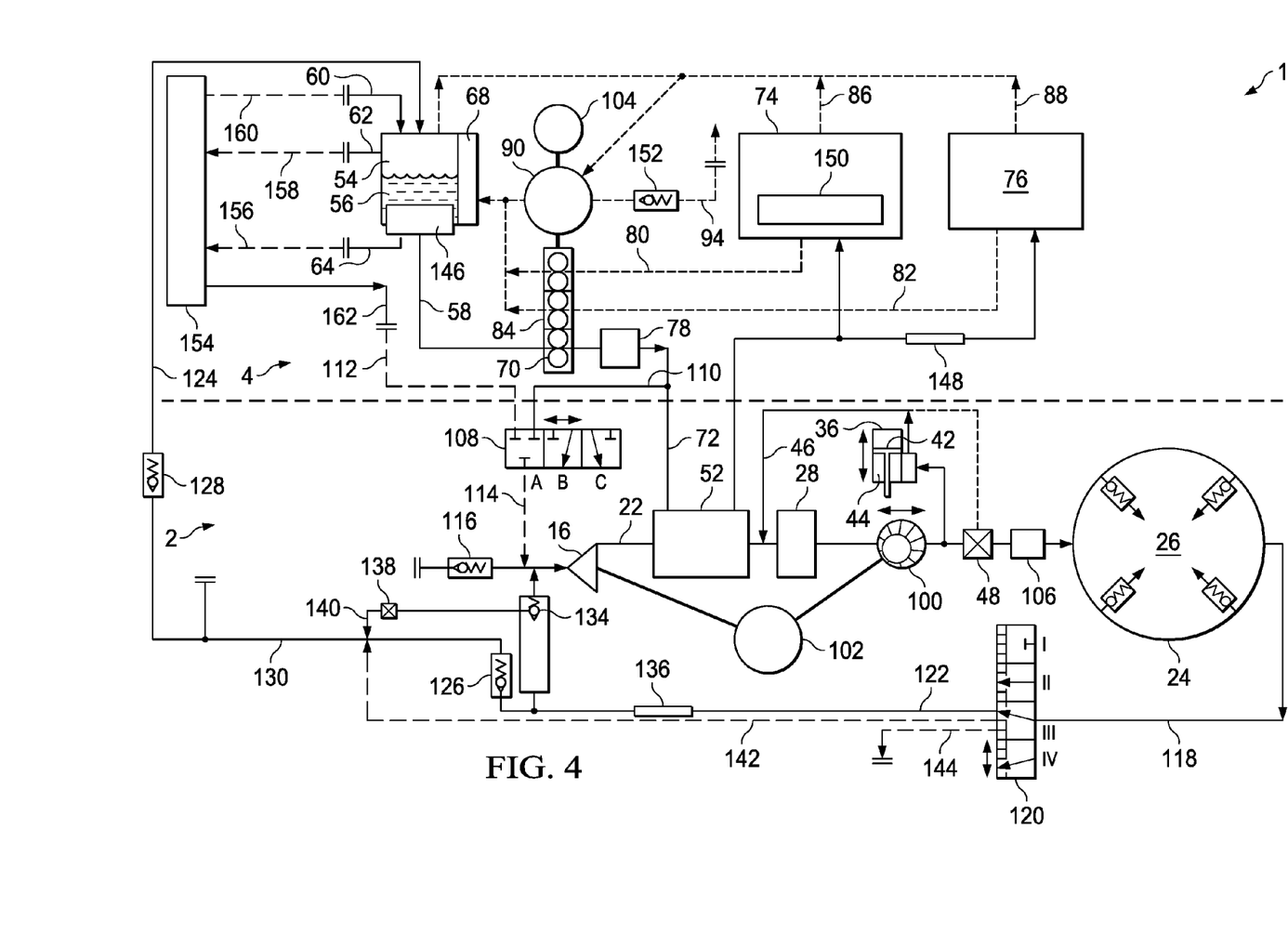
FIG. 4 A second device according to the invention for preserving a fuel system and an oil system.

FIG. 4 shows the device 1 according to the invention for preserving a fuel system 2 and an oil system 4 of a turbine engine when the engine is dismantled from an aircraft and stored in a container. Because the engine is stored separately from the aircraft, the fuel tank 6 is not depicted. Instead the oil system 4 is connected to an oil service panel 154, which is connected via a drainage hose 156 to the drainage channel 64, via an overflow hose 158 to the overflow channel 62, via a filling hose 160 to the filling channel 60 and via a filling hose 162 to the tank line 112 of the oil valve 108. In addition, the oil service panel 154 can be brought into fluid connection with the drainage line 114 of the oil valve 108. The oil service panel 154 is used in particular for monitoring and controlling or regulating the preservation, monitoring the device elements such as pumps 16, 100, 70, 84, valves 108, 120, etc. and for making external fluid or electrical energy available.

When the engine is stored in a container, the required electric energy for triggering the electric drives 102, 104 comes from an external power source or, when the engine is stored on the aircraft, alternatively also from the aircraft's auxiliary power unit (APU). Maintenance instructions and service schedules for preservation can be taken from or can be programmed via the oil service panel 154 in the container or via appropriate displays and devices of the aircraft.

In addition, control functions are provided for which regularly check the technical state of the valve arrangement. Among these are e.g., control of the electric drives 102, 104 for triggering the fuel pumps 16, 100 as well as the oil pumps 70, 84 and the oil separation device 90. In addition, checks are made to see whether the main valve 18 (not shown in FIG. 4) is closed during a suction filling of the fuel system 2 with fluid from an external tank. Likewise, at least the switch settings of the oil valve 108 and the fluid valve 120 are checked.

In the case of a fuel flush or oil flush of the electro-hydraulic actuator 36, the piston 42 is moved over its entire stroke in the cylinder 44 thereby ensuring that the previous fluid is replaced. During a preservation run, the piston 42 is likewise moved over its entire stroke. All surfaces and seals are hereby wetted with the fluid 56 and the fluid in the fuel system 2 is replaced.

To preserve the bearings and gear mechanism 74, the main shafts are cranked with the starter/generator. If all the main shafts do not have a starter/generator 76 that can be switched to crank as a motor, then a mechanical, electrical, hydraulic or pneumatic connection must be established between the shafts.

The non-return valves 116, 134, the pressure relief valves 126, 128, the pressure control valve 138 as well as the pressure-increasing valve 106 are actuated by the oil pressure in the fuel system 2 and the oil system 4. The pressure control valve 152 is actuated by the pressure of air and vapor in the oil tank 54, the chambers 74, 76 and the oil separator 90.

Figure 5:
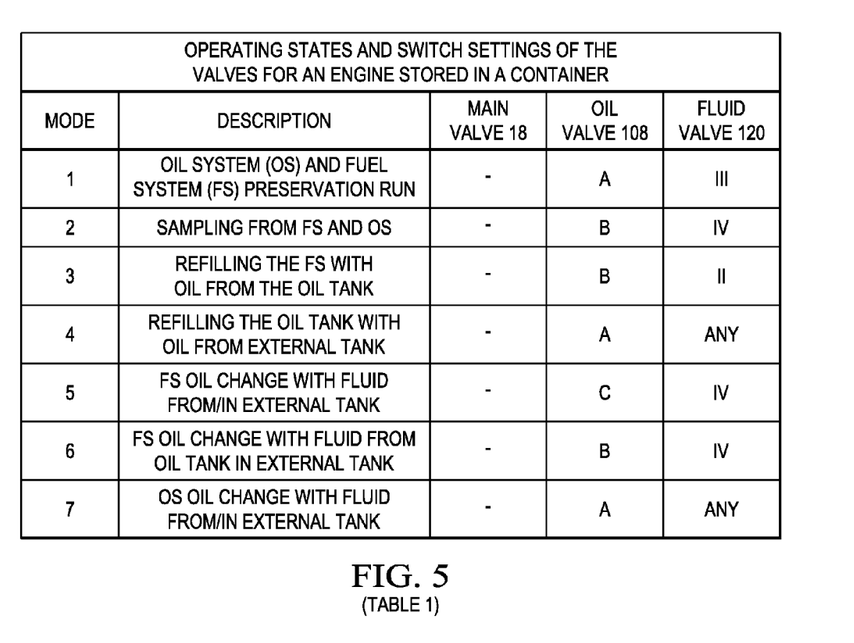
FIGS. 5 and 6 Tables listing the operating modes of the inventive exemplary embodiments in accordance with FIGS. 3 and 4.

Examples of operating modes of the device 1 according to the invention will be explained in the following:

Preservation after Corrective Maintenance, an Overhaul, a Repair or the Like in a Container After manufacturing, corrective maintenance, an overhaul, a repair or the like, the engine is stored for example in a container (see FIG. 4, Table 1, Mode 1). The oil system 4 and the fuel system 2 are filled with a preserving agent or oil and the fuel system 2 is vented to the oil tank 54. The oil channels 60, 62, 64 of the oil tank 54 are connected to the oil service panel 154. The pressure control valve 152 in the ventilation channel 94 of the oil separation device 90 is connected to an output connector of the container. In addition, the engine is connected to a corresponding power supply of the container.

In the case of a preservation run that must be carried out at regular intervals, the engine shafts, the fuel pumps 16, 100 as well as the oil pumps 70, 84 and the oil separator 90 are regularly put into rotation by the electric drives 102, 104. At the same time, the oil 56 in the oil system 4 and the fuel system 2 is heated above an evaporating temperature of the water accumulated in the oil, for example $T_{oil}$>120° C. In addition, if no measuring devices 136, 148 are provided, periodic oil samples are taken for laboratory tests. To do this, the oil valve 108 is transferred to its switch setting B and the fluid valve 120 to its switch position IV (Table 1, Mode 2) and the oil samples are taken from the line 144. Oil samples from the oil system 4 are taken from the line 156 at the oil service panel 154.

If it is necessary to refill the fluid 56, this is accomplished by transferring the oil valve 108 to its switch setting B and the fluid valve 120 to its switch position II or by transferring the oil valve 108 to its switch setting A. The fluid valve 120 in this case may be in any operating position (Table 1, Modes 3 and 4).

If it is necessary to change the oil 56 in the fuel system 2, this may be accomplished in two different ways. First, the fresh oil may be removed from an external tank and the old oil may be conveyed to an external tank. In this case, the oil valve 108 is in switch setting C and the fluid valve 120 in its switch position IV (Table 1, Mode 5). Secondly, the fresh oil can be removed from the oil tank 54 and the old oil can be conveyed to an external tank. To do so, the oil valve 108 is in its switch setting B and the fluid valve 120 in its switch position IV (Table 1, Mode 6).

To change the oil 56 in the oil system 4, the oil valve 108 is put into its switch setting A so that the valve line 114 to the fuel system 2 is controlled to close. The oil is drained from the drainage channel 64, which is connected to the drainage hose 156 of the oil service panel 154. Thus, the fluid valve 120 may be in any switch position (Table 1, Mode 7).

The preservation according to the invention allows for the engine to be removed at any time from the container without replacing any fluids and be installed on an aircraft. In principle, only the supply lines to the oil service panel 154, the ventilation channel 94 and the drainage line 144 must be disconnected.

Installation of the Engine from the Container to an Aircraft for Preservation

The oil system 4 as well as the fuel system 2 are filled with a preservation oil or oil 56 and the fuel system 2 is connected to the fuel tank 6 via the fuel tank lines 14 and 130 (see FIG. 3). The required oil system service channels 60, 62, 64 on the oil tank 54 are accessible via service flaps on the aircraft. The ventilation channel 94 of the oil system 4 is connected to an aircraft-side ventilation connection. The engine control unit (ECU) is connected to the aircraft. In addition, the engine is connected to the aircraft's electrical power supply.

Figure 6:
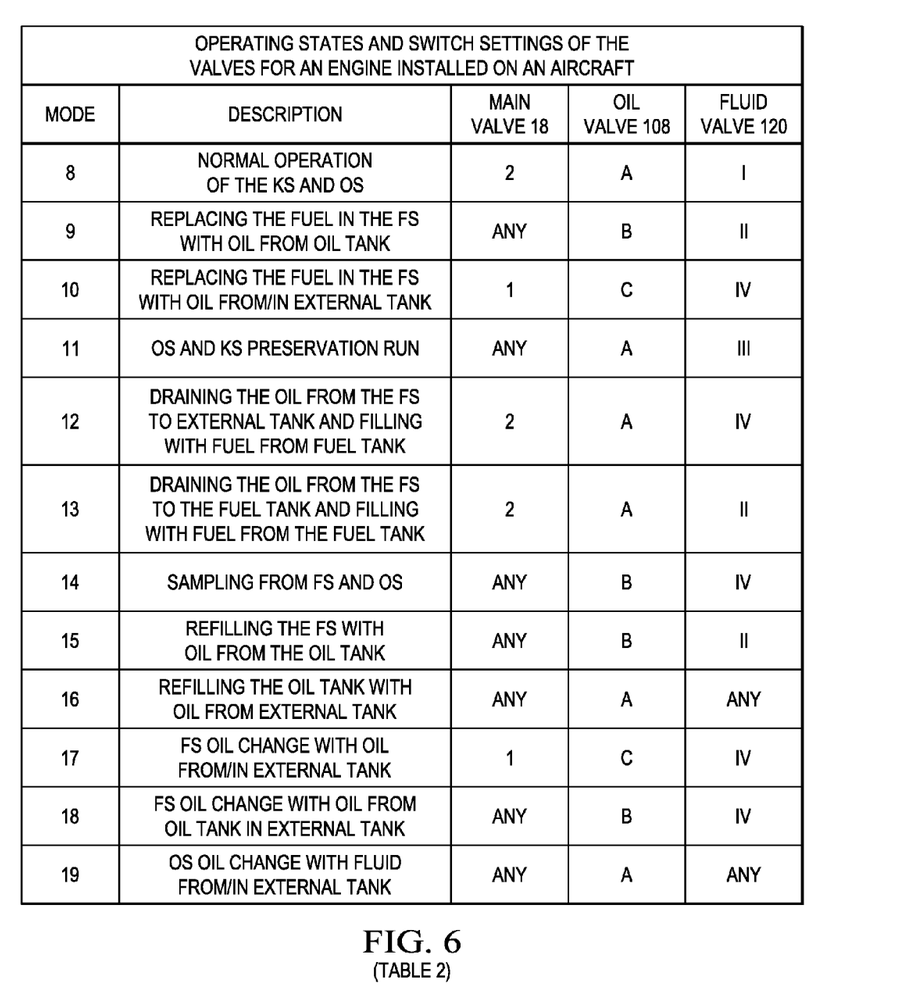

In the case of a preservation run on the aircraft, the engine shafts, the fuel pumps 16, 100, the oil pumps 70, 84, the oil separator 90 as well as the fuel-hydraulic actuator 36 are regularly rotated or moved. Similarly, the oil 56 in the oil system 4 and the fuel system 2 is regularly heated. In this preservation run, the main valve 18 is in any operating position, the oil valve 108 in switch setting A and the fluid valve 120 in switch position III (Table 2, Mode 11).

If the device 1 does not have any integrated measuring devices or measuring sensors 136, 148 for checking the oil quality, oil samples are taken from the fuel system 2 for laboratory tests at regular intervals by transferring the oil valve 108 to its switch setting B and the fluid valve 120 to its switch position IV. In this case, the main valve 18 is in any operating position (Table 2, Mode 14). Oil samples from the oil system 4 are taken from the drainage channel 64 of the oil tank 54.

Refilling oil in the fuel system 2 with oil 56 from the oil tank 54 may be accomplished in that the oil valve 108 is transferred to its switch setting B and the fluid valve 120 to its switch position II. This type of refilling is carried out independent of the setting of the main valve 18 (Table 2, Mode 15). The oil tank 54 may be filled up with fresh oil from an external tank. To do so, the oil valve 108 must be transferred to its closed setting A and the oil system 4 must be blocked from the fuel system 2. This type of refilling is carried out independent of the fluid valve 120 and the main valve 18 (Table 2, Mode 16).

In the case of an oil change in the fuel system 2, the old oil may be replaced with two types of fresh oil. First, the old oil may be drained into an external tank and be replaced with fresh oil from an external tank. To do this, the oil valve 108 must be transferred to its switch setting C, the fluid valve 120 to its switch position IV and the main valve 18 to its operating position I (Table 2, Mode 17). Secondly, the old oil in the fuel system 2 may be replaced with fresh oil from the oil tank 54 and, in doing so, the old oil is drained into an external tank. This is accomplished in that the oil valve 108 is transferred to its switch setting B and the fluid valve 120 to its switch position IV. The main valve 18 may be in any operating position (Table 2, Mode 18).

To change the oil 56 in the oil system 4, the oil valve 108 is put into its closed setting A so that the valve line 114 to the fuel system 2 is controlled to close. The oil is drained from the drainage channel 64. As a result, the main valve 18 and fluid valve 120 may be in any switch position (Table 2, Mode 19).

Preparations for Start-up of the Engine Preserved on the Aircraft

To prepare the engine that has been installed on the aircraft and previously preserved for start-up, the oil 56 must flow off from the fuel system 2 into an external tank and be replaced with fuel 8 from the fuel tank 6. For this, the systems 2, 4 are fluidly disconnected from each other. The oil valve 108 must be transferred to its switch setting A, the fluid valve 120 to its switch position IV and the main valve 18 to its operating position 2 (Table 2, Mode 12).

In the case of an emergency such as starting up the aircraft within a few hours, the oil 56 is drained from the fuel system 2 into the fuel tank 6 and replaced with fuel 8 from the fuel tank 6. To do this, the oil valve 108 is in its switch setting A, the fluid valve 120 in its switch position II and the main valve 18 in its operating position 2 (Table 2, Mode 13). The contamination of the fuel 8 with the oil 56 that occurs in the process can normally be accepted. However, this should be checked for every application case, if necessary in advance, by analyzing the combustion behavior in the combustion chambers 26.

After removing the oil 56 from the fuel system 2 and filling the fuel system 2 with the fuel 8, ignition of the engine takes place. The oil valve 108 is transferred to its switch setting A, the fluid valve 120 to its switch position I and the main valve 18 to its operating position 2. This means the fuel system 2 is fluidly disconnected from the oil system 4 and the fuel 8 may be conveyed from the fuel tank 6 to the distribution system 24 of the combustion chamber 26 (Table 2, Mode 8). At the same time, the oil 56 may circulate in the oil system 54.

Preparations of the Run Engine on the Aircraft and Preservation

After operating the engine, the engine may be transferred for preservation in that the fuel 8 is conveyed to the fuel tank 6 and replaced with oil 56 from the oil tank 54. In this case, the oil valve 108 is in its switch setting B and the fluid valve 120 in its switch position II. The main valve 18 has no impact on this process step (Table 2, Mode 9).

Alternatively, the fuel 8 in the fuel system 2 may be replaced in that said fuel flows off into an external tank and is replaced with fresh oil from an external tank. To this end, the oil valve 108 must be transferred to its switch setting C, the fluid valve 120 to its switch position IV and the main valve 18 to its operating position 1 (Table 2, Mode 10).

For pressure filling of the oil tank 54 with fresh oil from an external tank, the oil valve 108 is transferred to its closed setting A and therefore the valve line 114 is controlled to close. The fluid valve 120 as well as the main valve 18 have no impact on this type of pressure filling and may be in any switch position or operating position (Table 2, Mode 16).

In the case of a preservation run on the aircraft, the engine shafts, the fuel pumps 16, 100, the oil pumps 70, 84, the oil separator 90 as well as the fuel-hydraulic actuator 36 are regularly rotated or moved. Similarly, the oil 56 in the oil system 4 and the fuel system 2 is regularly heated. With this preservation run, the main valve 18 is in any operating position, the oil valve 108 in the switch setting A and the fluid valve 120 in the switch position III (Table 2, Mode 11).

The oil change in the fuel system 2 may be carried out in two ways. First, the old oil may be drained into an external tank and be replaced with fresh oil from an external tank. To do this, the oil valve 108 must be transferred to its switch setting C, the fluid valve 120 to its switch position IV and the main valve 18 to its operating position I (Table 2, Mode 17). Secondly, the old oil in the fuel system 2 may be replaced with fresh oil from the oil tank 54 and the old oil may be drained into an external tank. This is accomplished in that the oil valve 108 is transferred to its switch setting B and the fluid valve 120 to its switch position IV. The main valve 18 may be in any operating position (Table 2, Mode 18).

To change the oil 56 in the oil system 4, the oil valve 108 is put into its closed setting A so that the valve line 114 to the fuel system 2 is controlled to close. The oil may be drained from the drainage channel 64. Thus, the main valve 18 and fluid valve 120 may be in any switch position (Table 2, Mode 19).

This preservation basically allows immediate dismantling of the engine from the aircraft and storage in a preservation container without a prior fluid service.

Dismantling the Run Engine from the Aircraft and Preservation Storage in a Container The fuel 8 in the fuel system 2 is conveyed into an internal or external tank and is replaced with oil. In this case, the oil 56 can be taken for one from the oil tank 54 or be fed from an external tank. When removing the oil 56 from the oil tank 54, the oil valve 108 is in its switch setting B and the fluid valve 120 in its switch position II. The main valve 18 may be in any operating position (Table 2, Mode 9). When removing the oil 56 from an external tank, the oil valve 108 is in its switch setting C, the fluid valve 120 in its switch position IV and the main valve 18 in its operating position 1 (Table 2, Mode 10).

If necessary, the oil tank 54 may be filled up by a normal pressure filling, in which the oil valve 108 is in its switch setting A and therefore the oil system 4 is blocked from the fuel system 2. The fluid valve 120 and the main valve 18 may be transferred to any switch position or operating position (Table 2, Mode 16).

Then a first preservation run of the engine is carried out. To do so, the oil valve 108 is transferred to its switch setting A and the fluid valve 120 to its switch position III. The main valve 18 may be in any operating position (Table 2, Mode 11).

Then the engine is disconnected from the aircraft and stored in a container, whereby the device 1 is connected to the oil service panel 154 at least for oil transmission and data transmission. Furthermore, the ventilation channel 94 of the oil separation device 90 is connected to a corresponding output connection of the container as well as a power supply of the electric drives 102, 104 for example. Similarly, the drainage line 144 is connected to a corresponding output connection of the container.

Then a preservation run corresponding to Mode 1 (oil valve 108 in switch setting A and fluid valve 120 in switch position III) is carried out. During every preservation run, the engine shafts are put into rotation regularly by the starter/generator 76, and the fuel pumps 16, 100 and the oil pumps 70, 84 by the electric drives 102, 104. At the same time, the oil in the oil system 4 and the fuel system 2 is heated in order to release the water from the oil 56 and for example kill bacteria and fungi in the oil 56. In addition, if no measuring devices 136, 148 are provided, periodic oil samples are taken for laboratory tests. To do so, the oil valve 108 is transferred to its switch setting B and the fluid valve 120 to its switch position IV (Table 1, Mode 2).

If refilling the fluid 56 is necessary, this is accomplished by transferring the oil valve 108 to its switch setting B and the fluid valve 120 to its switch position II or by transferring the oil valve 108 to its switch setting A. The fluid valve 120 in this case may be in any operating position (Table 1, Modes 3 and 4).

If the oil 56 in the fuel system 2 has to be changed, the fresh oil may be taken from the external tank and the old oil conveyed to an external tank. In this case, the oil valve 108 is in the switch setting C and the fluid valve 120 in its switch position IV (Table 1, Mode 5). Similarly, the fresh oil may be taken from the oil tank 54 and the old oil may be conveyed to an external tank. To do so, the oil valve 108 is in its switch setting B and the fluid valve 120 in its switch position IV (Table 1, Mode 6).

To change the oil 56 in the oil system 4, the oil valve 108 is put in its switch setting A so that the valve line 114 to the fuel system 2 is controlled to close. Therefore, the fluid valve 120 may be in any switch position (Table 1, Mode 7).

In summary, in the case of the automated preservation of the fuel system 2 and the oil system 4 according to the invention, essentially the fuel 8 is drained from the fuel system 2 and replaced with a preservation fluid or oil 56. The oil used in this process is identical to the oil 56 used in the oil system 4 and may be conveyed via an external tank or via the oil tank 54 to the fuel system 2. Then the oil 56 for preservation is regularly transfer-pumped to the fuel system 2 and to the oil system 4. Prior to start-up of the engine, the systems 2, 4 are again fluidly disconnected from each other and the oil 56 in the fuel system 2 is drained into an external tank or into the fuel tank 6. Alternatively, said oil may also be discharged via the oil tank 54. Then the fuel system 2 is filled with fresh fuel 8 so that the engine is again in principle in an operationally ready state.

Basically, the device 1 according to the invention differs from the prior art according to FIG. 2 in terms of two factors. First, the fuel system 2 and oil system 4 according to the invention can be brought into fluid operation with one another so that the fuel system 2 may be supplied with the preservation oil via the oil system 4. Secondly, the fuel system 2 according to the invention and the oil system 4 according to the invention allow the preservation oil to circulate so that ground runs may be eliminated and a fully automated preservation may be carried out with appropriate monitoring of the functions of the device elements such as valves 18, 108, 120 and pumps 16, 100, 70, 84, the quality of the preservation oil and the fluid quantity present in the systems 2, 4.

Figure 7:
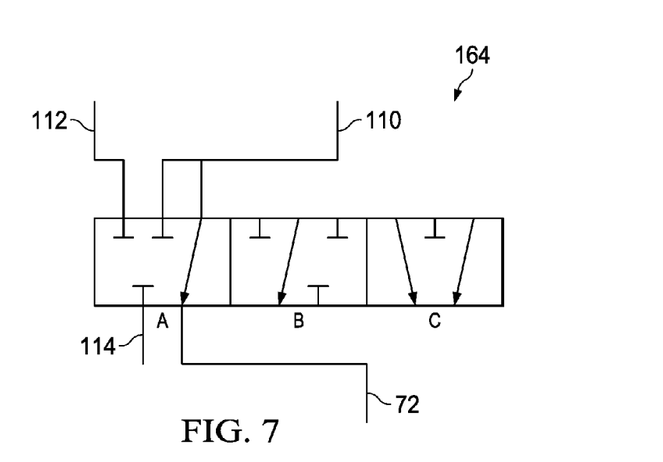
FIG. 7 A variant of an oil valve for establishing a fluid connection between the fuel system and the oil system.

According to FIG. 7, one variant provides that the oil valve 108 be replaced with a 5/3 directional valve 164 with three input connections, two output connections and three operating positions a, b, c. Essentially, in contrast to the oil valve 108, a 5/3 directional valve 164 allows the oil channel 72 to be controlled to close so that circulation in the oil system 4 may be interrupted completely and even the supply to the heat exchanger 52 is blocked thereby accelerating the filling of the fuel system 2.

The directional valve 164 is inserted into the oil channel 72 and makes it possible to control it to open and close. The tank line 112 and the supply channel 110 are attached to the other two input connections. The second output connection is connected to the valve line 114.

In its operating position a, the oil channel 72 is controlled to open and the tank line 112, the supply channel 110 and the valve line 114 are controlled to close. In its operating position b, the supply channel 110 is controlled to open and the oil 56 is conveyed via the valve line 114 into the fuel system 4. The tank line 112 and the oil channel 72 are controlled to close. In the operating position c, the tank line 112 is controlled to open and the oil 56 is conveyed via the valve line 114 into the fuel system 2. Likewise, the oil channel 72 is controlled to open so that the oil 56 in the oil system 4 may circulate. The supply channel 110 is controlled to close.

In the case of one exemplary embodiment, it is provided that the functional properties of the non-return valve 116 are integrated into the shut-off valve 18. The non-return valve 116 per se may be hereby eliminated, wherein, in the case that the engine is disconnected from the aircraft and stored in a container, a cover is used as a closure element of the then open outlet line 14. If the engine is installed on the aircraft, the shut-off valve 118 is in its closed or locked setting 1 during a maintenance run.

In the case of another exemplary embodiment, the functional properties of the pressure relief valve 126 are integrated into the ventilation valve 138. The line section of the fuel tank line 130 from the branch or connection of the non-return valve 134 to the junction point with the excess pressure line 140 and the recirculation line 142 is hereby eliminated. Thus, only the lines 140, 142 are still joined, which then continue on as the fuel tank line 130.

Disclosed is a device 1 for preserving fluid systems 2, 4, for example of a fuel system 2 and an oil system 4 of a turbine engine, with at least one drive 102, 104 for driving at least one fuel pump 16, 100 and at least one oil pump 70, 84, wherein a valve arrangement is provided, which makes transfer-pumping a fluid 56 between the fluid systems 2, 4 possible, an engine having such a device 1 as well as a method for triggering such a device 1 or for preserving fluid systems 2, 4.

The invention claimed is:

1. A device for preserving fluid systems of a turbine engine, the turbine engine including engine shafts, the fluid systems including a fuel system and an oil system, the fuel system having a fuel therein and a fuel pump for conveying the fuel or an oil therein, and the oil system having the oil therein and an oil pump for conveying the oil therein, the device comprising:
   at least one drive operatively connected to each of the fuel pump and the oil pump for driving the fuel pump and the oil pump;
   a first valve assembly operatively connected between the fuel system and the oil system and switchable between at least a first setting and a second setting;
     wherein, when switched to the first setting, the first valve assembly provides fluid communication between the fuel system and the oil system such that transfer-pumping of oil between the oil system and the fuel system can occur therethrough; and
     wherein, when switched to the second setting, the first valve assembly interrupts fluid communication between the fuel system and the oil system such that transfer-pumping of oil between the oil system and the fuel system therethrough is blocked;
   a second valve assembly having a first inlet fluidly connected to a first location on the fuel system downstream of the fuel pump and a first outlet fluidly connected to a second location on the fuel system upstream of the fuel pump and switchable between at least a first setting and a second setting;
     wherein, when switched to the first setting, the second valve assembly provides fluid communication between the first inlet and the first outlet such that a fluid in the fuel system can circulate therethrough from downstream of the fuel pump to upstream of the fuel pump; and
   wherein, when switched to the second setting, the second valve assembly interrupts fluid communication between the first inlet and the first outlet such that the fluid in the fuel system cannot circulate therethrough;
   a fuel tank line fluidly connectable at a first location to a fuel tank and fluidly connected at a second location to a second outlet on the second valve assembly and providing fluid communications between the first and second locations;
   wherein the second valve assembly is further switchable to a third setting;
     wherein, when switched to the first setting or the second setting, the second valve assembly interrupts fluid communication between the first inlet and the second outlet such that a fluid in the fuel system cannot pass therethrough from the location downstream of the fuel pump to the fuel tank line; and
     wherein, when switched to the third setting, the second valve assembly provides fluid communication therethrough between the location downstream of the fuel pump to the fuel tank line.

2. A device according to claim 1, further comprising:
a pressure relief line fluidly connected at a first location to the fuel tank line and fluidly connected at a second location to the oil system; and
a non-return valve disposed along the pressure relief line between the first location and the second location and allowing fluid flow therethrough to occur only from the fuel system to the oil system.

3. A device according to claim 1, further comprising:
a drainage line fluidly connected at a first location to a third outlet of the second valve assembly;
wherein the second valve assembly is further switchable to a fourth setting;
  wherein, when switched to the first setting, the second setting or the third setting, the second valve assembly interrupts fluid communication between the first inlet and the third outlet such that a fluid in the fuel system cannot pass therethrough from the location downstream of the fuel pump to the drainage line; and
  wherein, when switched to the fourth setting, the second valve assembly provides fluid communication therethrough between the location downstream of the fuel pump to the drainage line; and
whereby the oil can be removed from the fuel system into the drainage line when the second valve assembly is switched to the fourth setting.

* * * * *